Dec. 18, 1951  N. MARCALUS  2,579,199
WINDING MACHINE
Filed Sept. 26, 1945  13 Sheets-Sheet 2

Inventor
Nicholas Marcalus,
By
Robert J. Beck
Attorney

Inventor
Nicholas Marcalus,
By Robert F. Beck,
Attorney

Dec. 18, 1951  N. MARCALUS  2,579,199
WINDING MACHINE
Filed Sept. 26, 1945  13 Sheets-Sheet 4
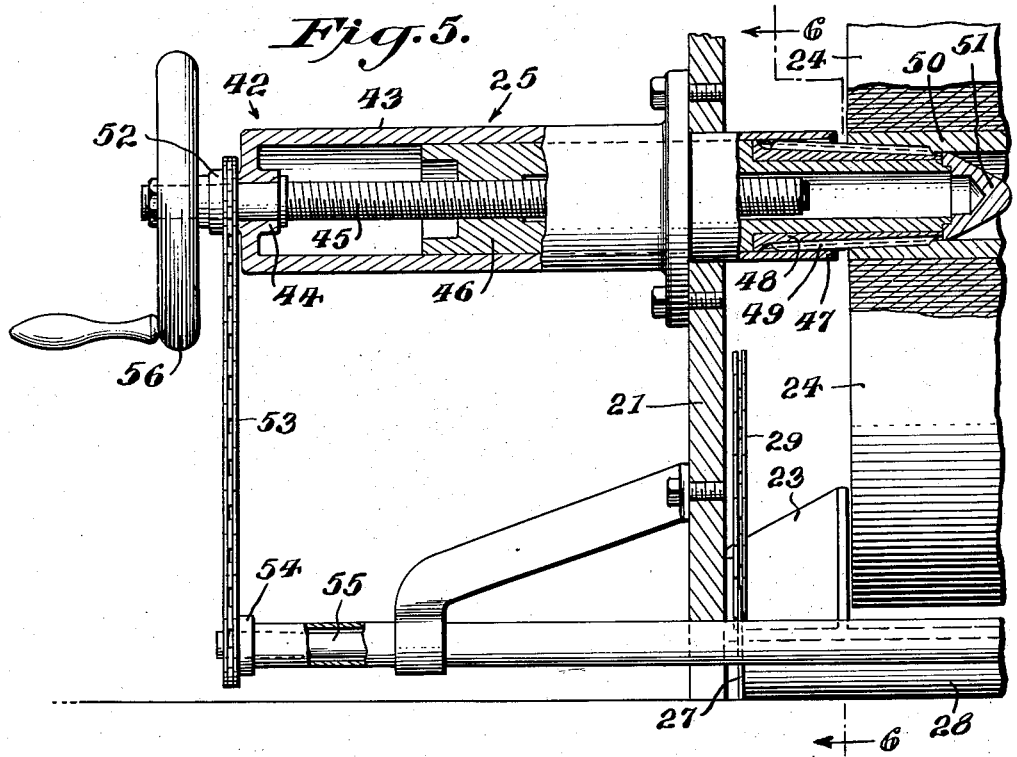
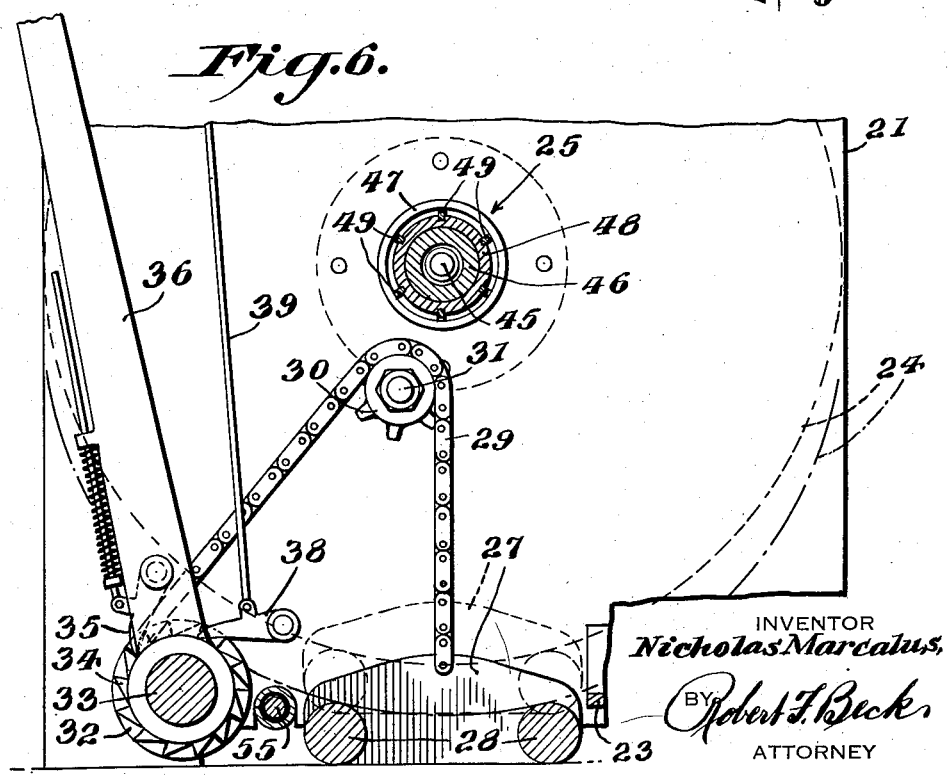
INVENTOR
Nicholas Marcalus,
BY Robert F. Beck
ATTORNEY Dec. 18, 1951   N. MARCALUS   2,579,199
WINDING MACHINE
Filed Sept. 26, 1945   13 Sheets—Sheet 5

INVENTOR
Nicholas Marcalus,
BY Robert F. Beck
ATTORNEY

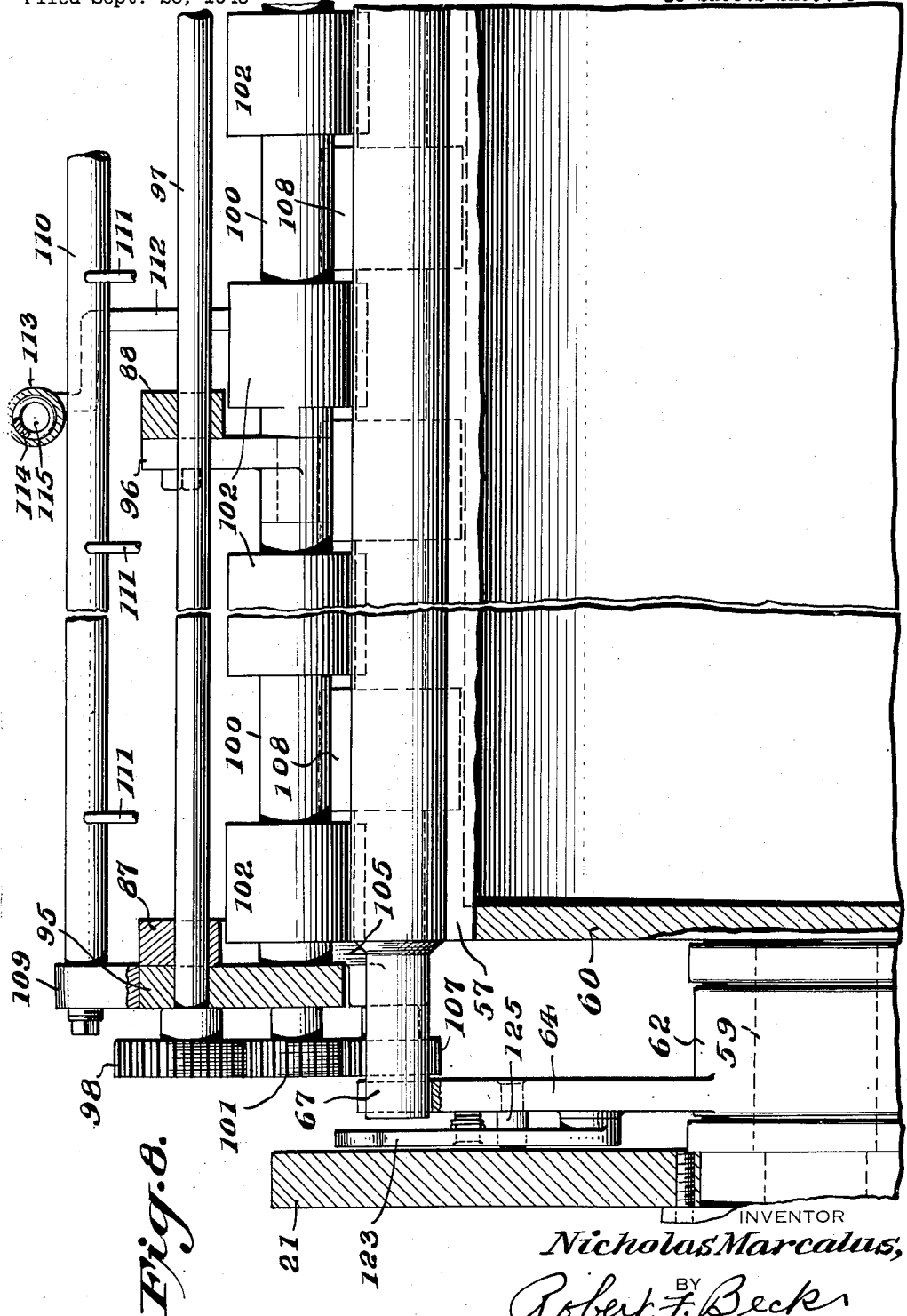

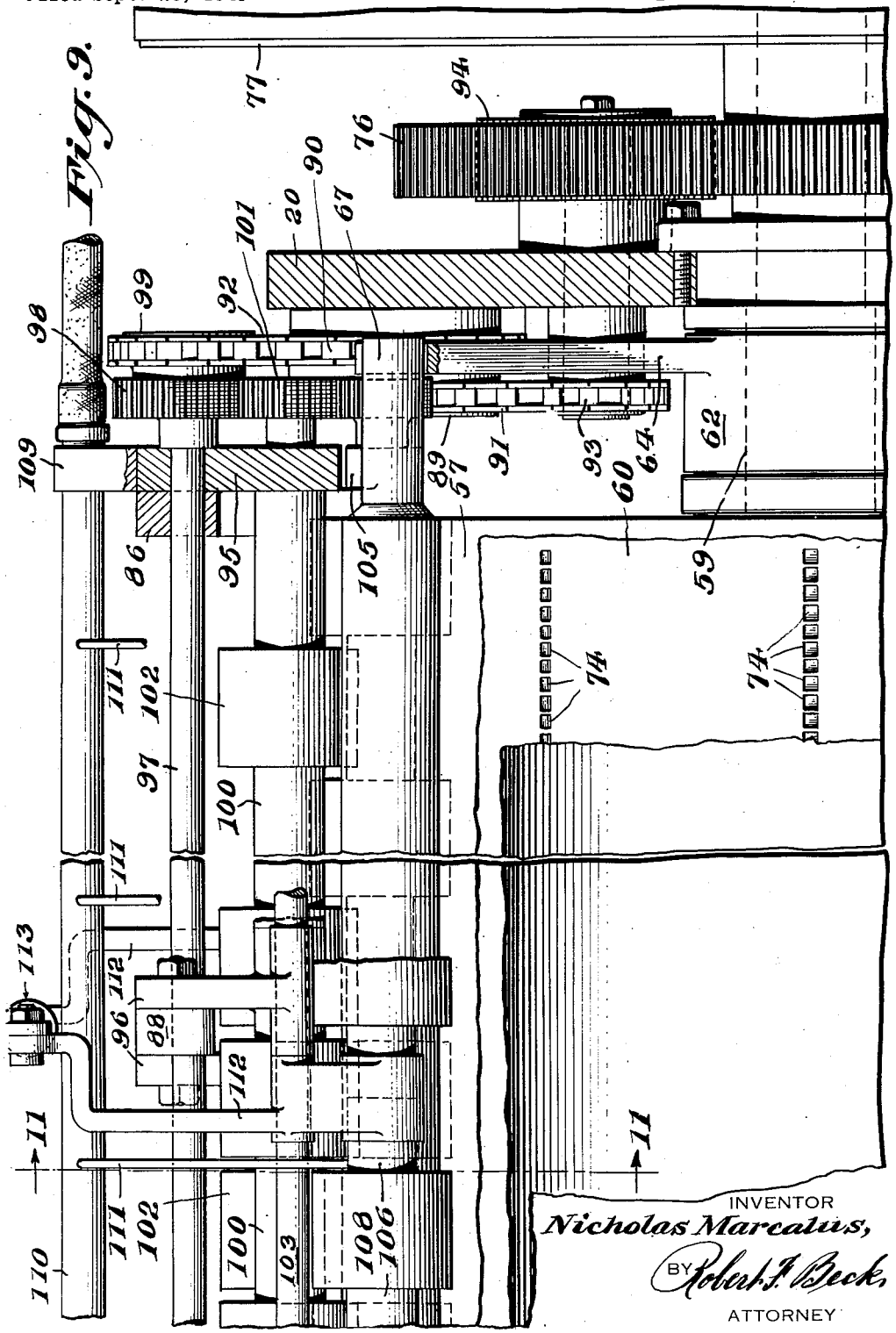

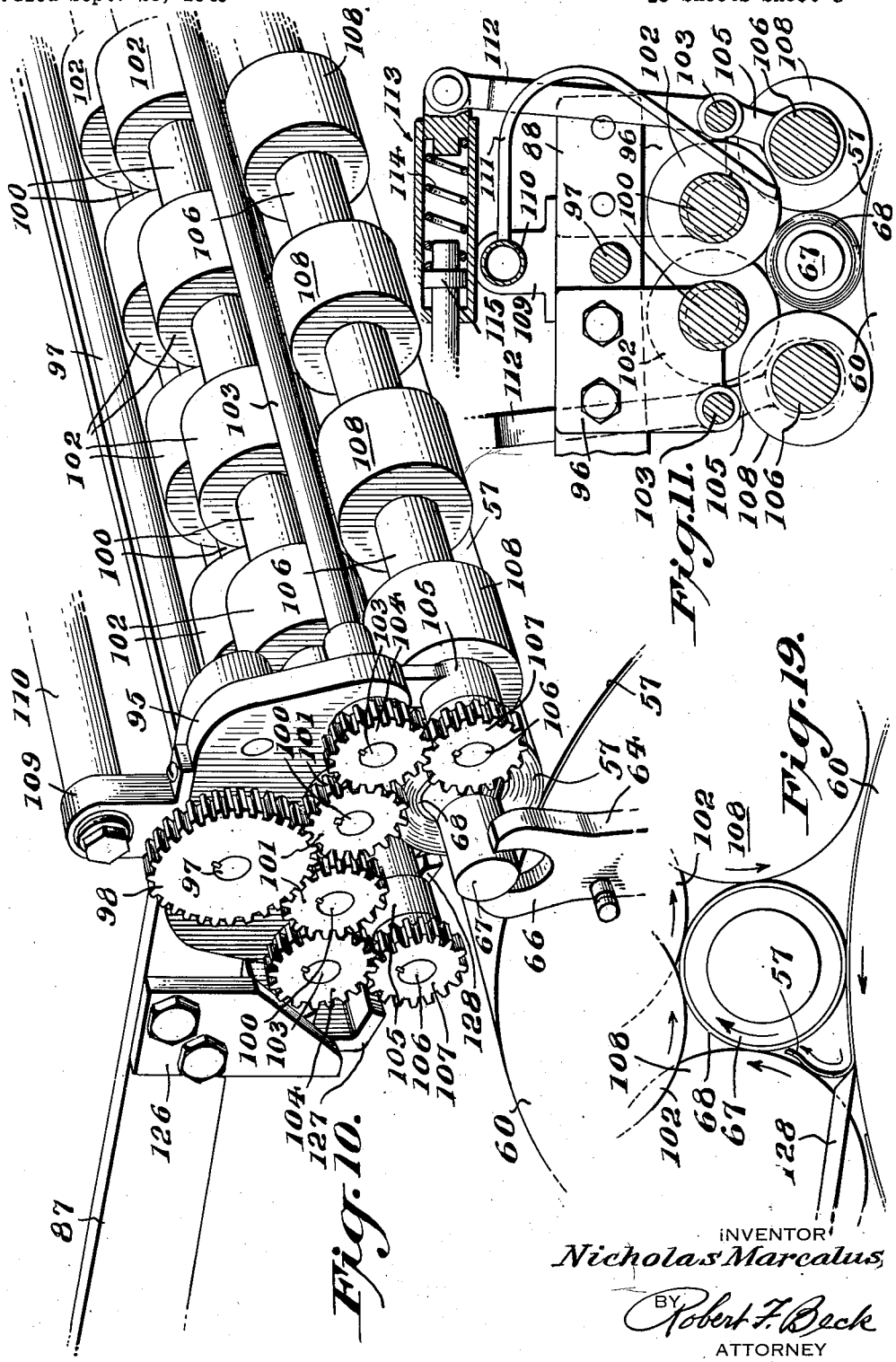

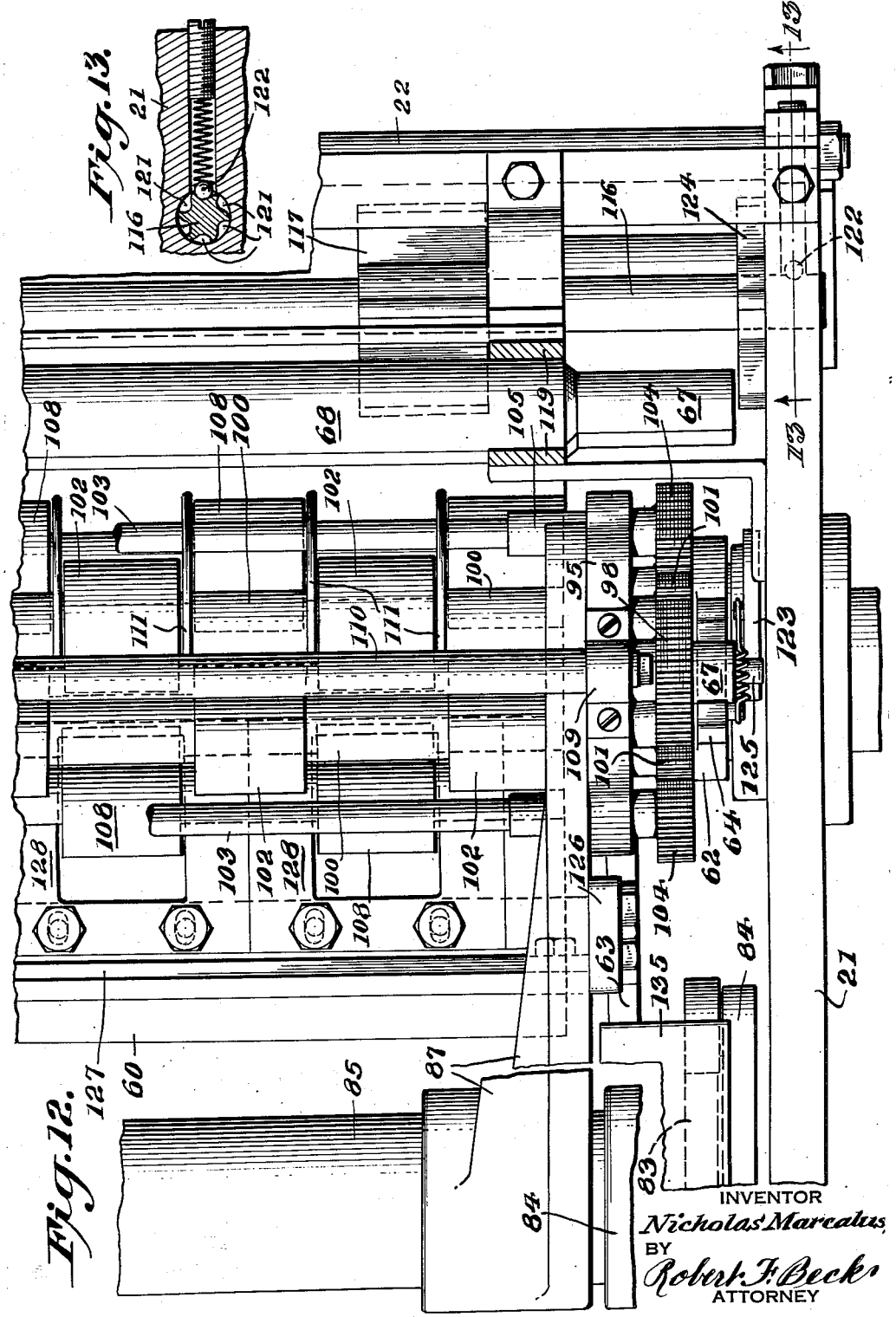

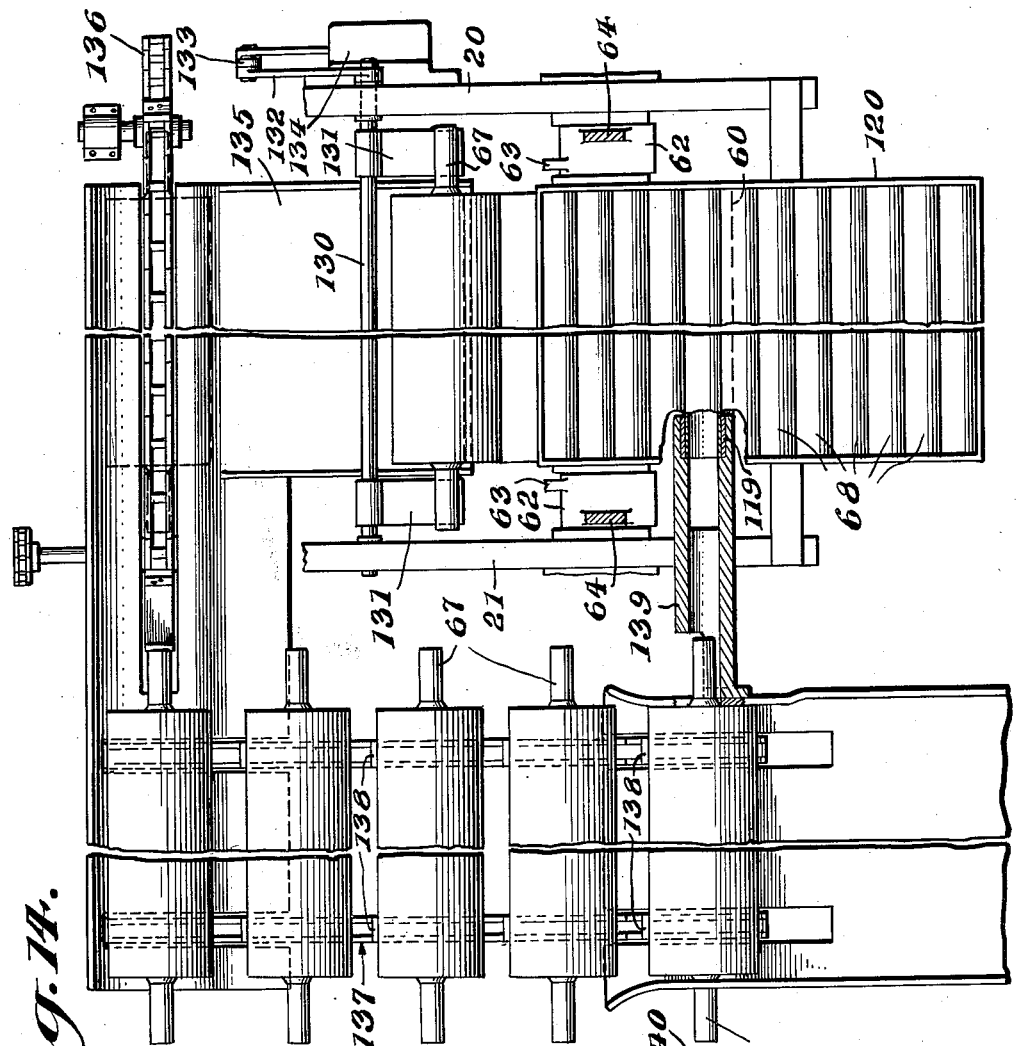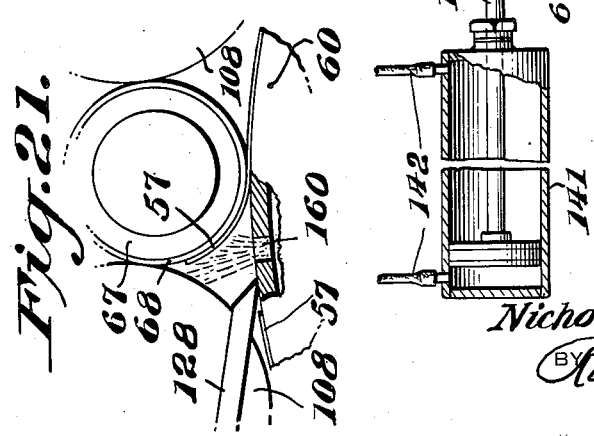

Dec. 18, 1951  N. MARCALUS  2,579,199
WINDING MACHINE
Filed Sept. 26, 1945  13 Sheets-Sheet 11

INVENTOR
Nicholas Marcalus,
BY Robert F. Beck
ATTORNEY

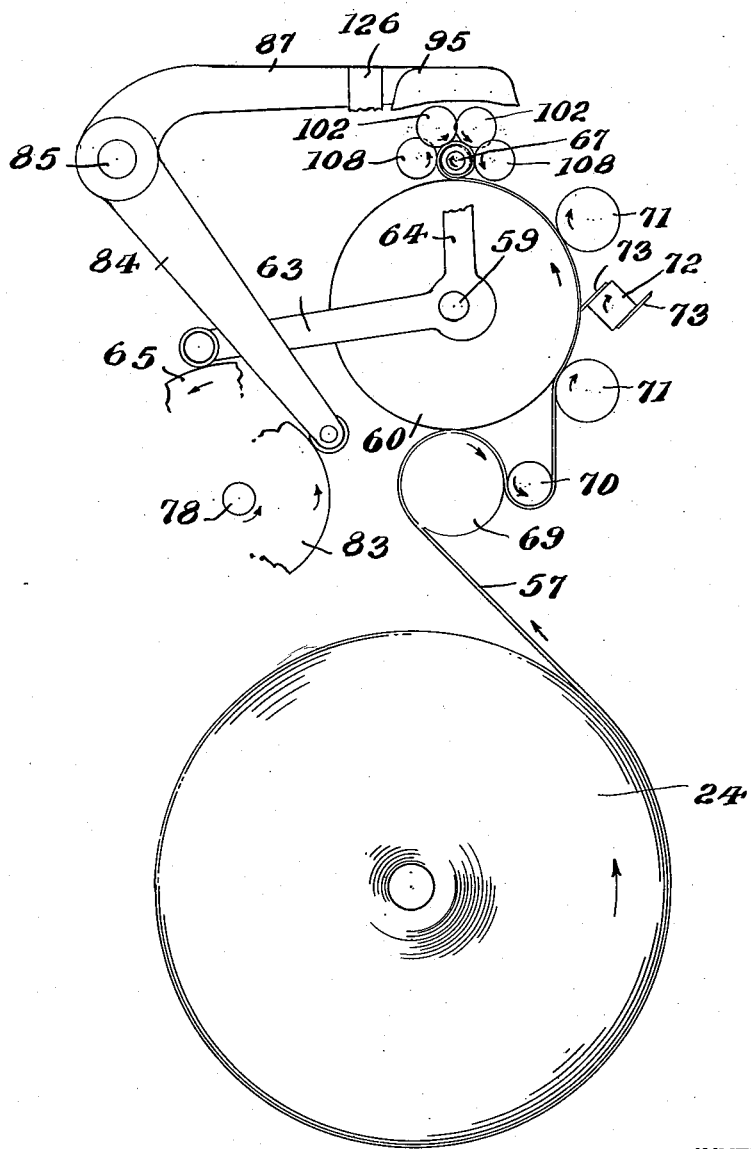

Dec. 18, 1951  N. MARCALUS  2,579,199
WINDING MACHINE
Filed Sept. 26, 1945 13 Sheets-Sheet 13
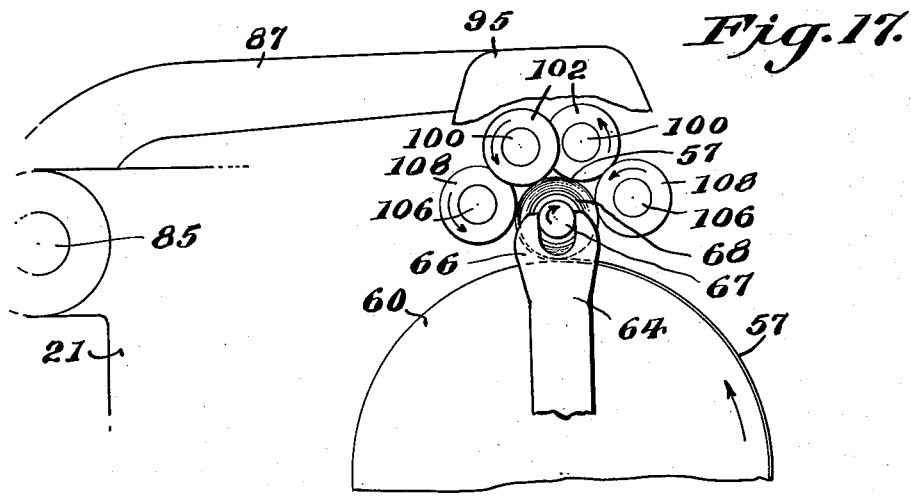
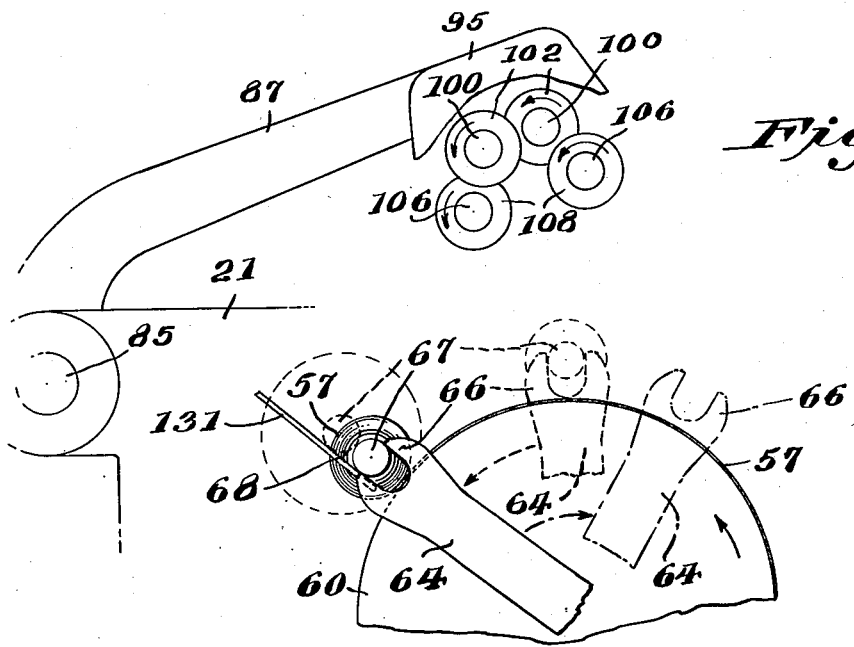
INVENTOR
Nicholas Marcalus
BY
Robert F. Beck
ATTORNEY Patented Dec. 18, 1951

2,579,199

UNITED STATES PATENT OFFICE 2,579,199

WINDING MACHINE

Nicholas Marcalus, West Englewood, N. J.

Application September 26, 1945, Serial No. 618,711

8 Claims. (Cl. 242—56)

My invention relates to winding and more particularly to a winding machine for winding and forming relatively small or minor rolls from a web of flexible material delivered from a relatively large parent or supply roll.

Heretofore, many machines available for delivering a web of flexible material, for instance, paper from a suppy roll, and winding the web to form a plurality of relatively small or minor rolls, necessitated operations wherein a tender or operator removed the supply roll mounting shaft or spindle from the machine; trundled the supply roll, by means of a dolly, into proximity to the machine; inserted the shaft through the supply roll; raised the supply roll, by means of a block and tackle, into an approximate feeding position; connected the shaft within bearing blocks; and thus conditioned the machine for use and manipulation by an operator who then trained the outer or free end section of the web, from the supply roll, about the feeding drum of the machine; mounted a tube or quill upon a spindle or core to preclude deformation of the tube during winding of the web thereabout; disposed the spindle and tube in the machine; manually wrapped several turns of the free end section of the web about the tube; started the machine to effect winding of the web about the tube by motive power; observed the winding of the web about the tube until an approximation of the desired quantity of paper had been wound about the tube; stopped the machine when approximately the desired quantity of the material had been wound about the tube; transversely severed the web; telescopically removed the spindle from the tube; transferred the minor roll thus formed from the machine to a suitable receiver or the like; and repeated the foregoing described cycle of operations until the paper of the supply roll was exhausted.

Obviously, use of machines of the foregoing described character present many difficulties and disadvantages, for instance, the disproportionate amount of time consumed, due to the various manual operations, with respect to the number of minor rolls obtained; the necessity of employing highly skilled and efficient operators endowed with keen judgement, coupled with sufficient alertness, to preclude excessive winding of material upon the minor rolls during winding thereof; and possessed of excellent physical stamina to enable them to perform and repeat the various manual operations over a pre-established work period.

My invention overcomes the foregoing difficulties and disadvantages, it being one of the objects thereof to provide a machine for automatically and continuously winding and forming minor rolls from material of a supply roll, thereby, effecting an economy of time and permitting the employment of other than a highly skilled and long trained operator.

Another object of my invention is to provide a machine of the foregoing described character equipped with novel means for raising the supply roll and mounting the same in feeding position.

Still another object of my invention is to provide a machine of the foregoing described character equipped with means for automatically inserting and removing the cores within and from the tubes while minor rolls are being wound and formed.

A further object of my invention is to provide a machine of the foregoing described character equipped with means for automatically severing the web upon completion of minor rolls and in a manner wherein the material wound on the minor roll is of uniform predetermined lengths.

A still further object of my invention is to provide a machine of the foregoing described character which readily lends itself to a work performing sequence in a manner to permit its incorporation within a battery of similar machines, thus, eliminating the services of all but a single operator or tender for the battery.

An important object of my invention is to provide a machine of the foregoing described character wherein automatic means is employed for successively feeding the tubes to the minor roll winding position.

Another important object of my invention is to provide a novel type of head mechanism for initiating winding of the minor rolls.

A further important object of my invention is to provide a machine of the foregoing described character which is simple in construction, durable in use, efficient in operation, economical in maintenance, and which lends itself to high productivity with respect to the forming of minor rolls from a supply roll.

With the above and other objects in view, as will hereinafter appear, my invention consists in the combination and arrangement of parts hereinafter set forth and illustrated in the accompanying drawings, from which the several features of the invention and the advantages attained thereby will be readily understood by those skilled in the art.

Referring to the drawings wherein like reference characters designate like parts throughout the several views:

Figure 5 is a sectional view taken on the line 5—5 of Figure 2.

Figure 6 is a sectional view taken on the line 6—6 of Figure 5.

Figures 8 and 9 are detail sectional views of opposite end portions of the machine taken on the line 8—8 of Figure 7.

Figure 10 is a perspective view of an end of the head mechanism.

Figure 11 is a sectional view taken on the line 11—11 of Figure 9.

Figure 12 is a sectional view taken on the line 12—12 of Figure 7.

Figure 13 is a detail sectional view taken on the line 13—13 of Figure 12.

Figure 14 is a somewhat diagrammatic top plan view of my invention.

Figure 16 is a diagrammatic elevation illustrating the path of the web from the supply roll to winding position about a tube or quill.

Figure 17 is a diagrammatic view illustrating one phase of the winding of a minor roll.

Figure 18 is a diagrammatic view illustrating another phase of the winding of a minor roll.

Figure 19 is a diagrammatic view illustrating the manner in which the web is severed and guided into winding relation with the quill.

Figure 20 is a longitudinal sectional view of a quill having a detachable core positioned therein.

Figure 21 is a view similar to Figure 19 illustrating means for insuring the severed end of the web being guided about a tube for winding.

Figure 1:
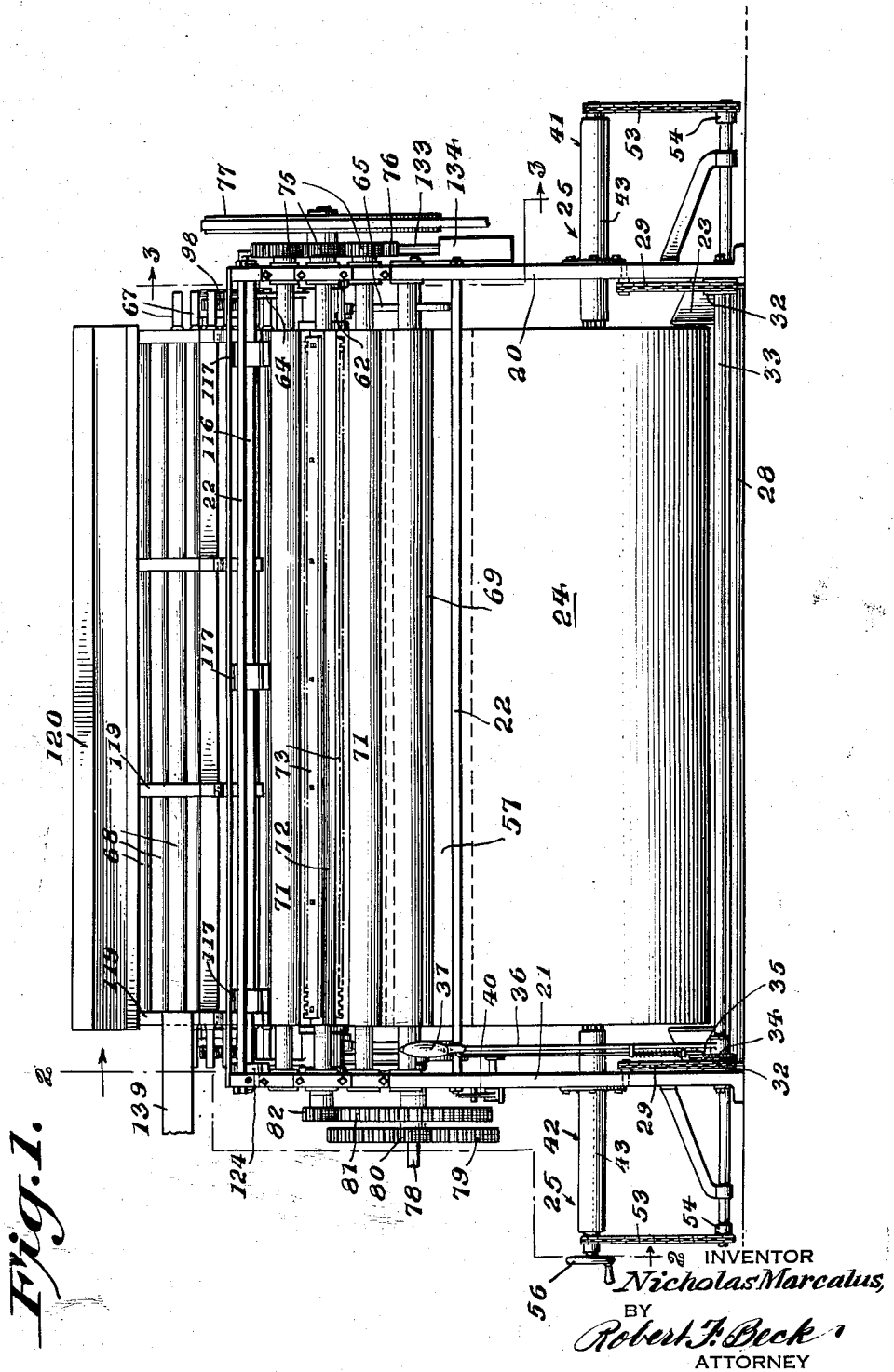
Figure 1 is a front elevation of my invention, various components being removed.
Figure 2:
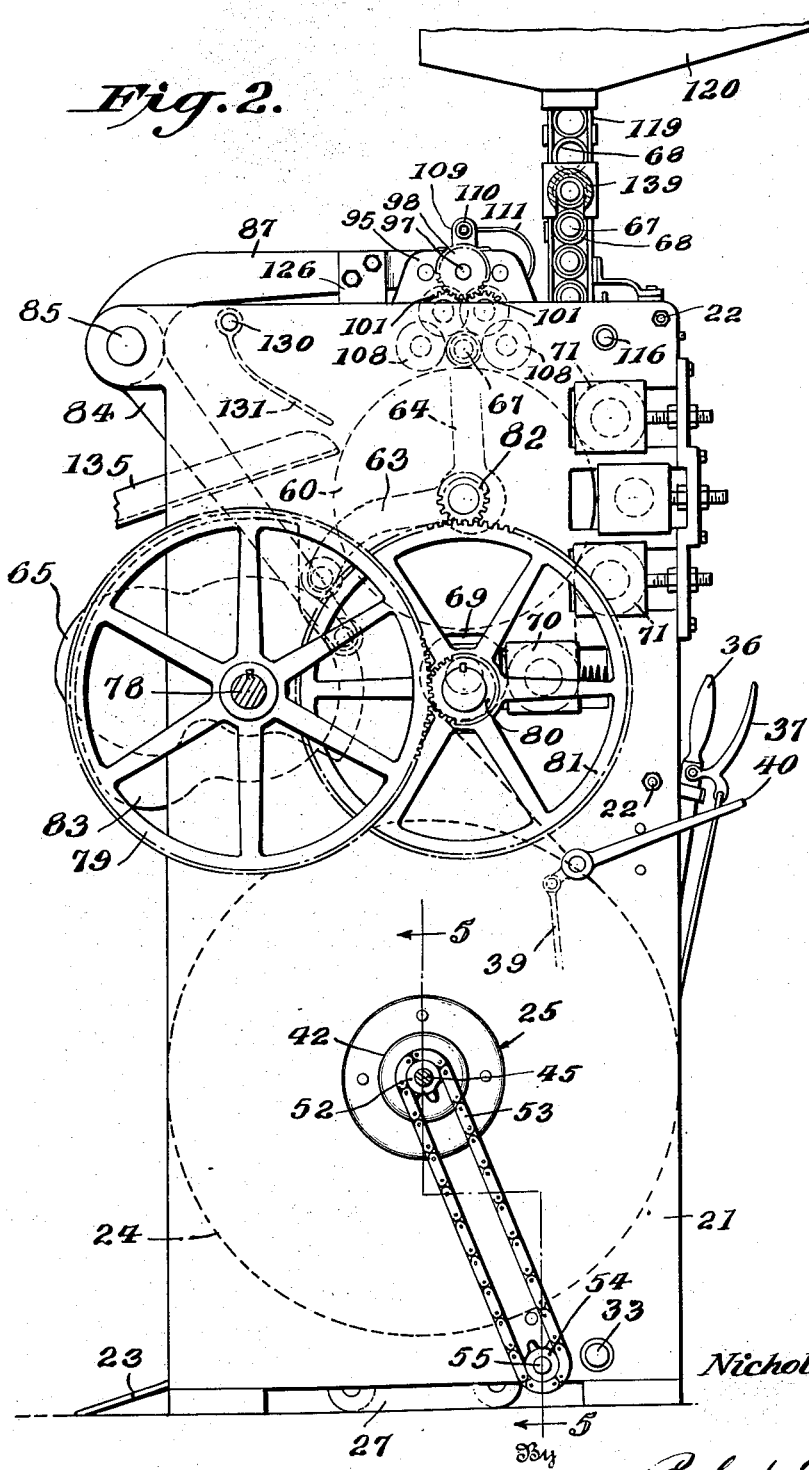
Figure 2 is a sectional view taken on the line 2—2 of Figure 1.
Figure 3:
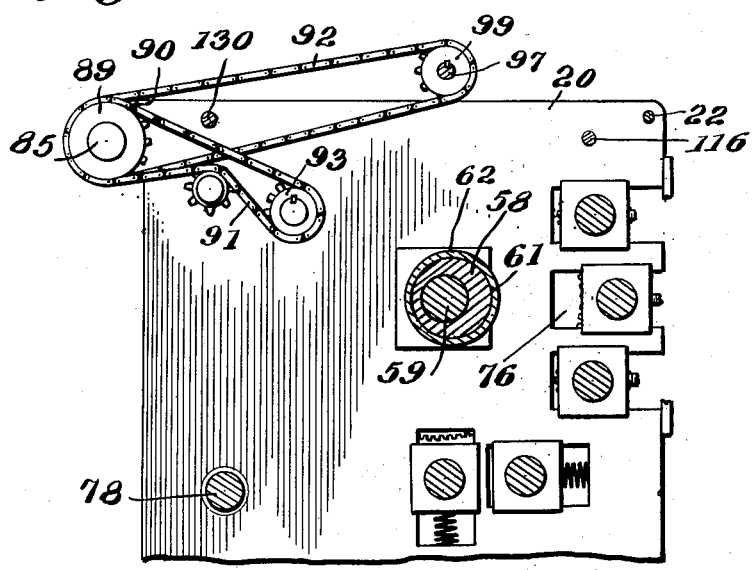
Figure 3 is a sectional view taken on the line 3—3 of Figure 1.
Figure 4:
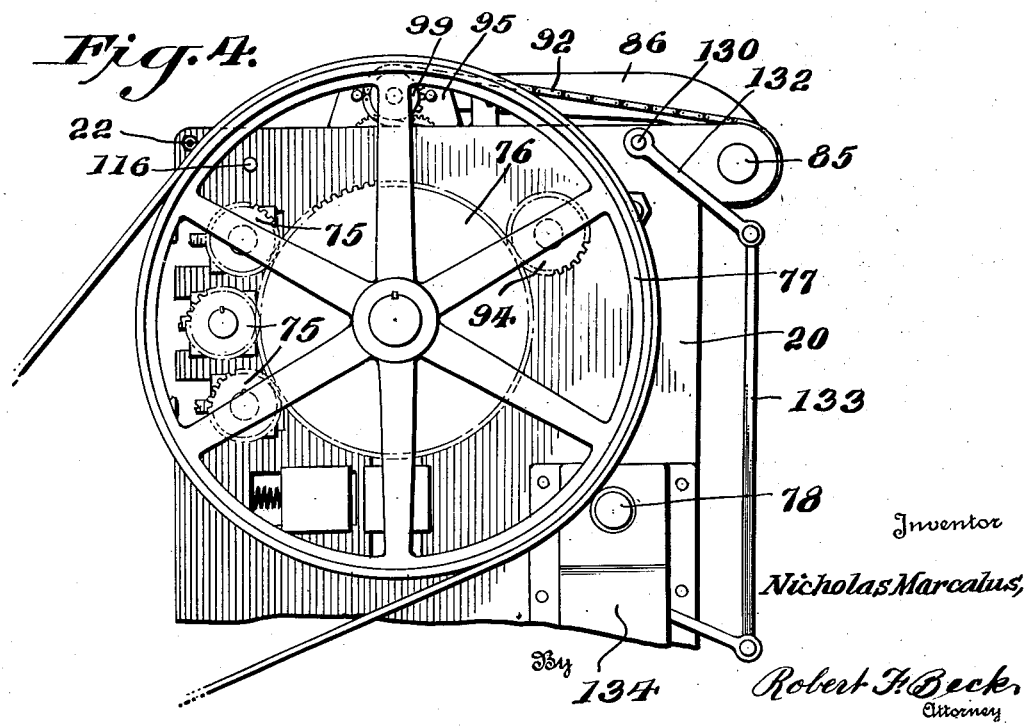
Figure 4 is an elevation of the upper portion of the dextral end of the machine.

As illustrated in the drawings, the machine comprises a frame having dextral and sinistral end sections or standards 20 and 21, respectively, secured together in spaced relation by means of tie rods 22 and other components of the machine. The rear of the frame, adjacent the bottom, is provided with a ramp 23 over which a supply or parent roll 24 of paper or the like is delivered between the standards for mounting, in web feeding position, by means of supply roll mounting means 25. The ramp is formed with an incline connected to a platform, the latter and the incline being equipped with side walls for guiding the roll 24 towards a central position in the machine.

Adjacent the ramp 23 and disposed centrally of the frame, as shown in Figures 1, 2, 5 and 6, the machine is provided with a jack mechanism or elevator for receiving the roll 24 from the ramp and raising it into the web feeding position for mounting by the supply roll mounting means 25. The elevator comprises a pair of end plates 27 between and to which are secured a pair of elongated cylinders 28 which receive and centralize the roll 24 for raising the same into the feeding position. Each of the plates 27 has attached thereto the end of a sprocket chain 29 trained over a sprocket 30 journaled on a stub shaft 31 carried by the adjacent standard. The opposite end of each of the sprocket chains 29 are connected to a winding drum 32 constituting a component of a winch mechanism. The drum is fixed to a shaft 33 having its ends journaled in the standards, the end of the shaft 33, adjacent the standard 21, having fixed thereto a ratchet 34 engaged by a spring-pressed pawl 35 carried on an operating lever 36 rotatably mounted on the shaft 33. Operation of the lever in a direction away from the machine serves to effect counter-clockwise rotation of the shaft as viewed in Figure 6, through the medium of the ratchet and pawl, for raising the elevator. The lever 36 is provided with a finger piece 37 connected to the pawl 35 by means of a rod for raising the pawl out of engagement with the ratchet 34 to permit clockwise rotation of the ratchet and shaft for effecting lowering of the elevator.

Adjacent the ratchet 34, the standard 21 has pivoted thereto a similar pawl 38 for engaging the ratchet 34 to secure the same against clockwise rotation when the lever 36 is retracted or moved towards the machine to effect further counter-clockwise rotation of the shaft 33 for continued raising of the elevator. A rod 39 is connected to the pawl 38 and operated by means of a handle 40 pivoted to the standard 21 for raising the pawl 38 out of engagement with the ratchet 32 to permit clockwise rotation of the shaft 33 for lowering the elevator when the pawl 35 is raised and the supply roll 24 is disposed in feeding position by the mounting means 25.

The supply roll mounting means 25 is disposed above the winch mechanism, as illustrated in Figures 5 and 6, and comprises a pair of spindle units 41 and 42 carried by the standards 20 and 21, respectively, and which units engage and rotatably secure the supply roll between the standards when the supply roll has been raised by the elevator and the latter subsequently lowered as heretofore described. Each of the units 41 and 42 comprises a housing 43 formed, adjacent one end, with a flange bolted to the adjacent standard and at the opposite end with a bearing 44 in which is journaled one end of a screw shaft 45, the latter being threaded into a bearing block 46 longitudinally movable in the housing upon rotation of the screw shaft 45. The outer end 47 of the block is diametrically reduced and has rotatably mounted thereon a frustum-shaped sleeve 48 provided on its outer periphery with longitudinally extending circumferentially spaced ribs 49.

The sleeve 48 and the outer end 47 of the block 46 is adapted to be actuated into the adjacent end of the hollow core 50 of the supply roll, whereby, the ribs form channels in the inner peripheral face of the core 50 to establish a fixed connection between the roll and sleeve for effecting rotation of the roll relative to the block 46 and housing 43. The outer end of the block 46 is provided with a substantially conical member 51 having a bulbous nose and which member 51 functions to maintain the sleeve 48 rotatably mounted on the outer end 47 of the block and to facilitate actuation of the sleeve into the core upon movement of the block 46 towards the roll.

The end of the screw shaft 45, adjacent the bearing 44 and outside of the housing 43, has fixed thereto a sprocket 52 which carries a sprocket chain 53 trained over one of a pair of similar sprockets 54 fixed on the ends respectively of a drive shaft 55 extending through a casing carried by the standards. Adjacent the sprocket 52 of one of the units, the screw shaft 45 is provided with a hand-wheel 56 for effecting operation of the screw shaft, it being understood that a motor (not shown) may be connected to the screw shaft 45 in lieu of a hand-wheel if desired. From the foregoing, it will be apparent that when the supply roll has been raised by the elevator to a position in coaxiality with the spindle units 41 and 42 and the screw shafts 45 of the units operated to extend the sleeves 48 within the core of the supply roll, the latter will be rotatably mounted between the standards for feeding or delivering the web 57 from the roll during rotation of the latter.

Superjacent the spindle units 41 and 42, the standards, as illustrated in Figures 1, 2, 3, 7, 8, 9, 13, 14, 16, 17 and 18, are equipped with trunnion bearings 58 having journaled therein trunnions 59 carried on the end walls of a feed drum 60 and which bearings are fashioned with eccentric outer peripheral bearing faces 61 on each of which is rotatably mounted the hub 62 of a carrier. The carrier comprises a pair of angularly related cam and core arms 63 and 64, respectively, connected at their inner ends to the hub, the outer end of the cam arm being provided with a roller or follower for tracking the cam path of a cam 65 for actuating the carrier as hereinafter more fully described. The core arm 64 is formed with an outer bifurcated end 66 in which is delivered, as will hereinafter become apparent, the diametrically reduced end section of a cylindrical rigid core 67 detachably frictionally retained within a hollow cylindriform quill or tube 68 on which the web 57 of the paper, from the supply roll, is wound.

As illustrated in Figure 16, the web 57, from the supply roll, is trained over a pressure roller 69 and in contactuality with the drum 60, and between the pressure roller 69 and a guide roller 70, the latter being disposed in spaciality with the drum and subjacent a pair of pressure rollers 71 which engage the web to maintain the latter on the drum 60. Interjacent the rollers 71, I provide a rotary knife bar 72 on which is fixed a pair of oppositely disposed knives 73 having spaced perforating edge sections registering with and operable into slots 74 formed in the periphery of the drum for perforating the web during its travel with the drum. The pressure and guide rollers, together with the rotary knife bar 72, are rotatably journaled in adjustable bearings carried by the standards. Coincident ends of the pressure rollers 71 and the knife bar 72 are equipped with pinions 75, respectively, and which pinions mesh with a drive gear 76 fixed to the trunnion adjacent the standard 20 and on which trunnion there is provided a pulley 77, adapted to be connected to a motor or the like for driving the machine.

The cam 65 constitutes one of a pair for operating the cam arms 63 of the carrier and which cams 65 are mounted for rotation, as illustrated in Figures 2, 3, 4, 15 and 16, upon a cam shaft 78 having its ends journaled in the standards 20 and 21, respectively. The end of the cam shaft 78, adjacent the standard 21, has fixed thereon a spur gear 79 meshing with a pinion 80 fixed to a shaft carried by the standard 21 and on which is fixed a spur gear 81 meshing with a pinion 82 fixed to the trunnion of the drum 60 adjacent the standard 21 whereby said cam shaft 78 is operated. The cam shaft 78 has also fixed thereon a cam 83 having a cam path tracked by a roller mounted on one end of a cam arm 84, the other end of the arm 84 being fixed to an actuating shaft 85 for raising and lowering a head mechanism which functions to initiate and effect winding of the web about the quill or tube 68.

The head mechanism is disposed superjacent the drum and comprises a ternary of spaced arms having a pair of dextral and sinistral arms 86 and 87 arranged adjacent the standards 20 and 21, respectively, as illustrated in Figures 2, 7 through 12, 16, 17 and 18, and the remaining arm 88 intermediate the pair. The arms 86, 87, and 88 have coincident ends fixed to the actuating shaft 85 which is journaled in bearings carried by the upper front corners of the standards and on which actuating shaft 85 is loosely mounted a relatively fixed pair of sprockets 89 and 90 over which are trained sprocket chains 91 and 92, respectively. The sprocket chain 91 is trained over and driven by a sprocket 93 fixed to a stub shaft carried by the standard 20 and on which is fixed a pinion 94 meshing with the spur gear 76.

The opposite ends of the arms 86 and 87, as illustrated in Figures 2, 3, 4, 7 through 12, and 16 through 19, are provided with depending bearing plates 95 while the opposite end of the arm 88 is equipped on each side with a bearing plate 96. The plates 95 have journaled therethrough a drive shaft 97 equipped with a gear 98 on each end and, adjacent the dextral standard 20, a sprocket 99 over which is trained the chain 92 whereby the drive shaft 97 is driven. Subjacent the drive shaft 97, the bearing plates 95 and 96 have journaled therethrough a pair of spaced front and rear roller shafts 100 equipped at each of their ends with gears 101 meshing with the gears 98 and, between the bearing plates, with a plurality of alternately spaced rollers 102, the rollers of one shaft being arranged in spaciality between the rollers of the other shaft and the latter to preclude engagement therewith.

The lower outer corners of the bearing plates have journaled therethrough a pair of front and rear supporting shafts 103 having gears 104 fixed to their outer ends and which mesh with the gears 101 of the roller shafts 100. The supporting shafts 103 have sleeved thereon, adjacent the bearing plates, pivotable bearing hangers 105, the lower ends of which have journaled therethrough roller shafts 106 equipped on their ends with gears 107 meshing with the gears 104. Inasmuch as the roller shafts 106 are pivotable about the shafts 103, through the medium of the hangers 105, the gears 104 and 107 are maintained in meshed relation at all times. As in the instance of the shafts 100, the roller shafts 106 are also equipped with spaced rollers 108 arranged in alternate relation with the rollers 102 of the adjacent shafts 100 as clearly illustrated in the drawings. From the foregoing it will be apparent that the rollers 102 and 108 are rotated in unison through the medium of the gears 98, 101, 104, and 107.

The bearing plates 95, as illustrated in Figures 2, 7, 8, 9, 10 and 12, have mounted thereon brackets 109 which support, above the rollers, a pipe 110 through which air is supplied to a plurality of branch pipes 111 connected to the pipe 110. The branch pipes 111 extend downwardly between the front rollers 102 and 108 and terminate in proximity to the drum 60 between the quill or tube 68 and the front roller 108 whereby air is discharged onto the web 57 for guiding the same under the quill or tube. The hangers 105, as illustrated in Figures 8, 9, and 11, adjacent the arm 38, are provided with upwardly extending arms 112 having their upper ends pivotally connected to a piston and cylinder respectively of a piston and cylinder assembly 113, the cylinder of which is provided with a spring 114 for urging the piston 115 outwardly thereby serving to maintain the rollers 108 in engagement with the web being wound on the quill 68.

The delivery of the core loaded quills or tubes 68 to the carriers is, as shown in Figures 1, 2, 7, 12 and 14, controlled by an indexing mechanism comprising a longitudinal extending indexing shaft 116 journaled in the standards at the front of the machine and superjacent the topmost pressure roller 71 and on which shaft 116 is mounted, in spaced relation, a plurality of spiders 117 formed with radially extending spokes or flights for successively receiving therebetween the core loaded tubes 68 from the chute 119 of a magazine 120 of a core loading and unloading organization. The end of the indexing shaft 116, within the standard 21, is formed on its periphery with a plurality of spaced notches 121 for successively receiving therein a spring-pressed ball 122 mounted in the standard 21 and with the notches being constructed in a manner to effect displacement of the ball from the notches to permit counter-clockwise rotation of the shaft and spiders 117 for delivering the tubes to the arms 66 of the carriers and to preclude displacement of the ball to prevent clockwise rotation of the shaft 116 and spiders as clearly illustrated in Figure 13 of the drawings.

Figure 7:
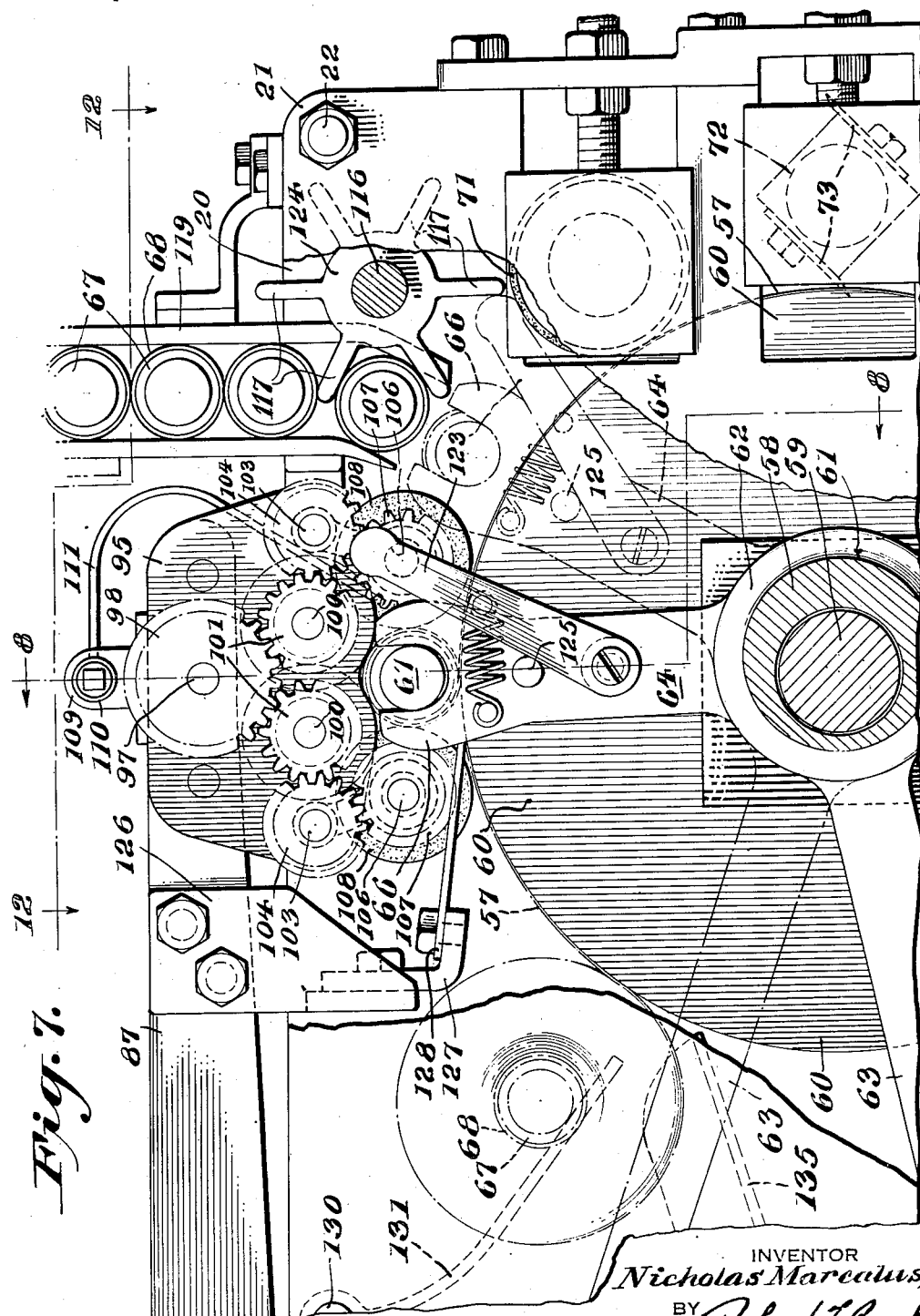
Figure 7 is a fragmentary elevation of an upper portion of the sinistral end of the machine.

The arm 64 of the sinistral carrier has pivotally mounted thereon the lower end of an indexing finger 123, the upper end of which successively engages the spokes of a shaft indexing spider 124 fixed to the shaft adjacent the standard 21 whereby to effect counter-clockwise rotation of the shaft 116 for delivering a tube to the tube arms as illustrated in dot-and-dash lines in Figure 7 of the drawings. The arm 64 of the sinistral carrier is provided with a stop pin 125 which engages the indexing finger 123 to maintain the outer end of the finger in position for engaging and rotating the indexing spider 124, a coil spring being connected between the arm and the finger to urge the indexing finger into engagement with the stop pin and to permit camming of the indexing finger out of engagement with the spider 124 when the arm 64 is clockwise rotated to deliver a tube into winding position upon the drum as illustrated in full lines in Figure 7. The tube, when received by the tube arm is maintained in spatiality with the drum until it is delivered, over a tangential path relative to the drum (by reason of the eccentricity of the periphery of the bearings 61), to the initial winding position on the drum 60 for rotation by the latter.

Means for severing the web 57, when a predetermined length thereof has been wound about a tube to form a minor roll, is provided, as shown in Figures 7, 10, 12, 19 and 21, and which means comprises a pair of depending brackets 126 secured to the arms 87 adjacent the rear rollers 101 and 102 and provided with a longitudinally extending tie member having vertically adjustably secured thereto the upper end section of a substantially L-shaped blade holder 127. The lower end section of the blade holder has adjustably secured thereto the heel sections of a plurality of blades 128 having their cutting edges disposed between the rear rollers 102 and a tube 68 when the latter is initially disposed in winding position on the drum, the cutting edges of the blades serving to sever the web in a manner hereinafter made apparent. Each of the blades is centrally apertured to permit the lower sections of the rear rollers 108 to extend therethrough.

Adjacent the actuating shaft 85, as illustrated in Figures 2, 7, 12, 14 and 15, the standards have journaled therein the ends of an intermittently operated shaft 130 having secured thereto, adjacent each standard, a depending gate or roll retainer member 131 for receiving the reduced end portions of the core when a partially wound minor roll has been advanced from its initial winding position to a final winding position by the drum 60 and to retain said roll in rotating condition in said final position upon the periphery of the drum until winding of the web is completed and said web severed by the blades 128. Adjacent the standard 20, the outer end of the shaft 130 has secured thereto an arm 132 coupled, by means of a link 133, to an arm of a control mechanism 134 operated by the cam shaft 78, whereby, the members 131 are intermittently pivoted to release the completed minor roll for discharge onto the upper end of a conveyor chute 135.

Figure 15:
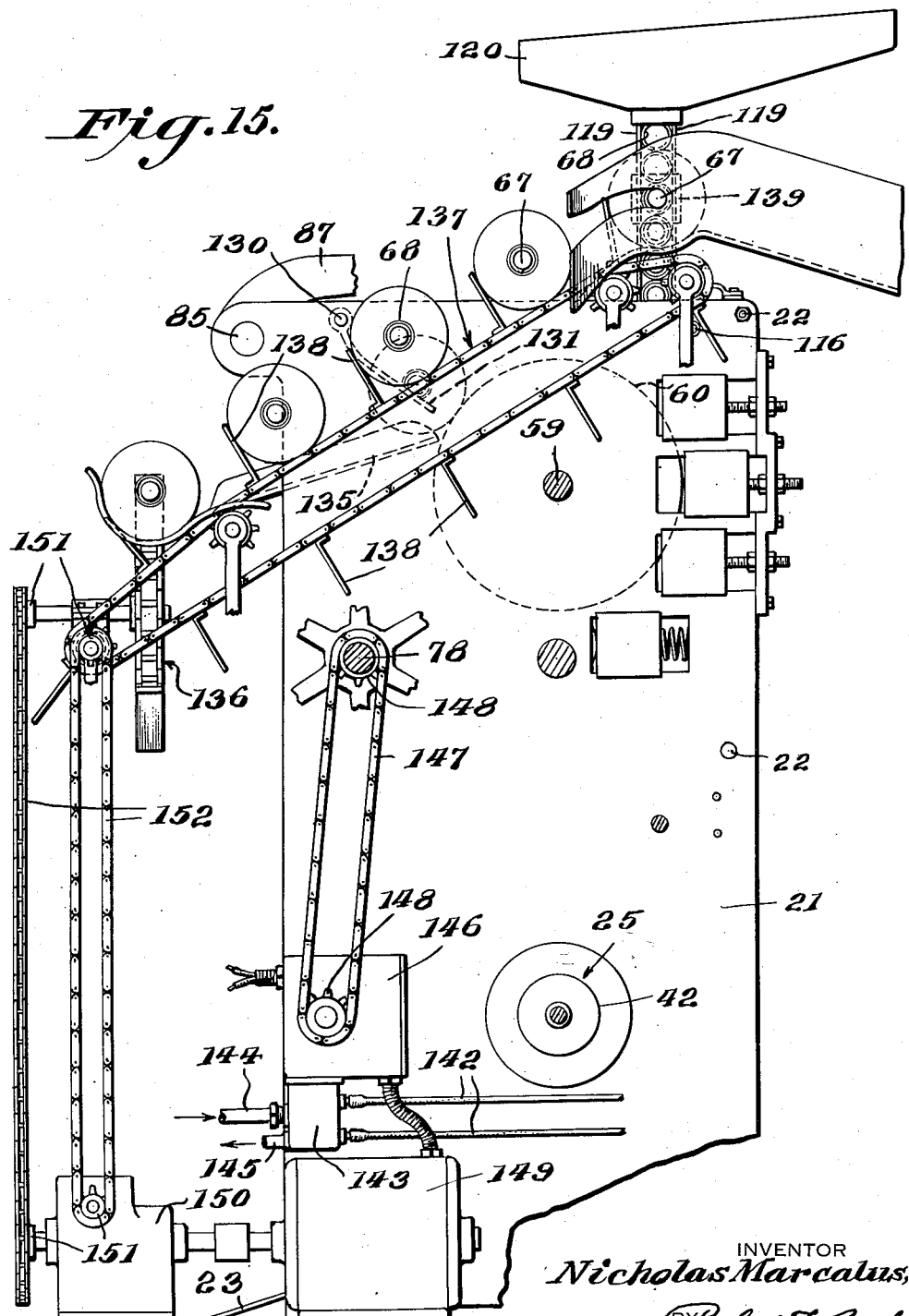
Figure 15 is a somewhat diagrammatic end elevation of the invention, various components being removed.

The lower end of the conveyor chute 135, as illustrated in Figures 14 and 15, is of an arcuate configuration for receiving the roll therein and has operating therethrough the flights of a conveyor 136 for engaging the dextral end of the core to longitudinally move the minor roll onto the lower end of an inclined conveyor 137 disposed transversely of and in front of the standard 21. The conveyor 137 is provided with flights 138 for engaging and moving the minor rolls upwardly to a core discharging or unloading position defined by an arcuate seat for receiving the roll and wherein the cores register with a guide member 139 carried by the chute 119 and through which member the cores are displaced out of the tubes of the completed minor rolls and injected into the tubes from the magazine by means of a pneumatically operated plunger mechanism, the plunger 140 of the latter engaging the sinistral end of the registering core and forcing the same out of the tube of the minor roll and into a tube contained in the chute and in registry with the guide member 139. When the tube in the chute is thus loaded, the plunger is retracted and the conveyor operated and discharges the core unloaded roll therefrom.

The plunger 140, as illustrated in Figure 14, is slidably mounted within a cylinder 141 and reciprocally operated therein by means of air introduced into and exhausted from the cylinders through the medium of pipes 142 connected to a control valve 143. The control valve 143 is connected to a source of compressed air (not shown) by a pipe 144 and provided with an exhaust port 145. The control valve 143 is operated by a control unit 146 which in turn is operated by the cam shaft 78 through the medium of a chain 147 trained over sprockets 148. The control unit 146 also serves to control the operation of an electric motor 149 connected to a power reduction unit 150, the latter in turn being connected to each of the conveyors 136 and 137 by means of sprockets 151 and chains 152, as illustrated in Figure 15.

In operation, the supply roll is moved over the ramp and positioned upon the cylinders 28 of the elevator whereupon the elevator is operated by the lever to raise the supply roll from the dot-and-dash line position to the dotted line position shown in Figure 6. When the roll is thus raised, the mounting means is operated to mount the supply roll for rotation on the sleeves 48 and the elevator actuated to lowered position. The free end of the web 57 of the supply roll is then trained about the rollers 69 and 70, around the drum 60, between the latter and the rollers 71, and partially around a tube 68, the latter having been moved by the carriers into initial winding position on the drum from the chute. When the free end of the web has thus been trained about the tube and with the rollers of the head mechanism embracing the tube, operation of the machine is effected with the result that rotary movement is imparted to the tube through the medium of the rollers 102 and 108 and the drum. As the number of convolutions of the web about the tube increases, the diameter of the minor roll thus being formed is likewise increased with the result that the free end of the web becomes securely wound about the tube, the latter forming an integrant of the minor roll thus being fabricated. When a sufficient length of the web has thus been wound about the core assembly, the head mechanism is raised, due to the operation of the cam shaft 78 and through the medium of the arms 95 and 84, whereupon, the carriers, by the operation of the cams 65, advance the partially formed minor roll from the initial winding position, illustrated in dotted lines, to a final winding position, shown in full lines in Figure 18. When the roll is thus advanced, the reduced end portions of the core member 67 engage the gate or retaining members 131 and maintain the roll in the final winding position until formation of the roll is completed. In this position, the reduced end portions of the core 67 are moved out of the confines of the bifurcated ends 66 of the arms 64, due to the increasing diameter of the roll. When the end portions of the core 67 have thus been moved out of the confines of the bifurcated ends 66 of the arms 64, the carriers are moved, by means of the cams 65, to the core assembly receiving position for receiving another core loaded tube 68 as illustrated in dot-and-dash lines in Figure 18. As the tube receiving arms are thus actuated to the core assembly receiving position, they effect operation of the indexing spider whereby a core assembly is discharged from the chute and delivered to the carriers which in turn carry the core assembly to the initial winding position.

Immediately preceding the completion of the winding of the web about the minor roll thus advanced to the final winding position, the cam 83 functions to effect lowering of the head mechanism whereby the front and rear rollers 102 and 108 embrace the tube while, at the same time, the knife blades engage the portion of the web leading to the roll retained by the gate and sever the web whereupon the severed end of the web, connected to the supply roll, is guided upwardly by the blades and about the tube of the rollers 102 and 108 as diagrammatically illustrated in Figure 19. Due to the spaced relation of the initial and final winding positions of the rolls and the severing position of the knife blades therebetween, as illustrated in Figure 19, the initial winding of one core assembly is obtained simultaneously with the final winding of the other core assembly, thus it will be apparent that during one period of the operation of the machine a plurality of core assemblies are simultaneously wound.

When the web is thus severed, the gate operates to discharge the completed minor roll onto the conveyor 136 from which it is moved to the conveyor 137 and into core registering or loading position with the guide member 139. While the thus completed roll is being moved to the aforementioned registering or core loading position, as illustrated in Figures 14 and 15, a series of minor rolls are being successively formed in the foregoing described manner, it being understood that the pneumatically operated plunger mechanism functions to eject the cores from the completed rolls as they reach the registering position and inject the same into the tubes fed from the magazine by means of the indexing mechanism.

If desired, means may be provided for insuring the severed end of the web 57, attached to the supply roll, being guided between the rear rollers 108 and a tube 68 for initiating winding of a minor roll. As illustrated in Figure 21, the drum 60 is perforated as at 160 and air discharged through the perforations from within the drum to blow or force the severed end in circumpressed relation with the tube 68 and thus guide the severed end between the tube 68 and the rear rollers 108.

Without further elaboration the foregoing will so fully explain the invention that others may, by applying current knowledge, readily adapt the same for use under various conditions of service. Moreover, it is not indispensable that all the features of the invention be used conjointly since they may be enjoyed advantageously in various combinations and subcombinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms and the invention comprehends all construction within the scope of the appended claims.

What I claim is:

1. In combination with web winding mechanism for winding a web, a core assembly having a tubular member on which the web is wound to form a roll thereon and integrally therewith and a reinforcing member detachably disposed within the tubular member to preclude collapsing of the latter during formation of the roll, and automatic means for delivering and releasing said assembly to and from said mechanism and for incorporating and removing said reinforcing member within and out of said tubular member before said delivery and after said formation, respectively, said automatic means including indexing mechanism for controlling the feed of assemblies to said mechanism and for retaining a tubular member at a loading station for receiving a reinforcing member respectively, conveyor means for conveying a roll when released to said station, and automatically operated means for ejecting and injecting said reinforcing member from said roll and into said tubular member when the latter and said roll are at said station.

2. In combination with web winding mechanism for winding a web, a core assembly having a tubular member on which the web is wound to form a roll thereon and integrally therewith and a reinforcing member detachably disposed within the tubular member to preclude collapsing of the latter during formation of the roll, and automatic means for delivering and releasing said assembly to and from said mechanism and for incorporating and removing said reinforcing member within and out of said tubular member before said delivery and after said formation respectively, said automatic means including a chute for delivering assemblies to said mechanism and for guiding a tubular member to a loading station for receiving a reinforcing member respectively, conveyor means for conveying a roll when released to said station, and automatically operated means for ejecting and injecting said reinforcing member from asid roll and into said tubular member when the latter and said roll are at said station.

3. In combination with web winding mechanism for winding a web, a core assembly having a tubular member on which the web is wound to form a roll thereon and integrally therewith and a reinforcing member detachably disposed within the tubular member to preclude collapsing of the latter during formation of the roll, and automatic means for delivering and releasing said assembly to and from said mechanism and for incorporating and removing said reinforcing member within and out of said tubular member before said delivery and after said formation, respectively, said automatic means including a delivery chute, indexing mechanism for controlling the feed of assemblies from said chute and for retaining a tubular member at a loading station in said chute for receiving a reinforcing member, respectively, conveyor means for conveying a roll when released to said station, and automatically operated means for ejecting and injecting said reinforcing member from said roll and into said tubular member when the latter and said roll are at said station.

4. In a web winding machine, the combination of a feed drum and oscillatory caging rolls coactive therewith for winding a web about a core assembly located between the feed drum and the caging rolls, means for moving said caging rolls away from and toward the feed drum with the delivery of a core assembly to an initial winding position between the feed drum and the caging rolls and the discharge of the partially wound core assembly from said initial winding position, respectively, means for guiding core assemblies toward the feed drum, an oscillatory carrier for moving core assemblies one at a time from said second mentioned means to a winding position between the feed drum and said caging rolls, and a spider means controlled by said oscillatory carrier for moving core assemblies one at a time from said second mentioned means to said carrier.

5. In a web winding machine, the combination of a feed drum and caging rolls coactive therewith for winding a web about a core located between the feed drum and the caging rolls, means for actuating said caging rolls relatively to said feed drum with the delivery of a core to a winding position upon the feed drum and the discharge of a wound core from said winding position, means for guiding cores toward the feed drum, a carrier for moving cores one at a time from said second mentioned means to a winding position between the feed drum and said caging rolls, and a spider means controlled by said carrier for moving the cores one at a time from said second mentioned means to said carrier.

6. In a web winding machine, the combination of a feed drum and oscillatory caging rolls coactive therewith for winding a web about a core located between the feed drum and the caging rolls, means for moving said caging rolls away from and toward the feed drum with the delivery of a core to a winding position between the feed drum and the caging rolls and the discharge of the wound core from said winding position, respectively, means for guiding cores toward the feed drum, an oscillatory carrier for moving cores one at a time from said second mentioned means to a winding position between the feed drum and said caging rolls, and means controlled by said oscillatory carrier for moving cores one at a time from said second mentioned means to said carrier, said carrier being mounted for pivotal movement and eccentrically with respect to the axis of said feed drum to move the cores in a tangential path with respect to the feed roll when the cores are delivered to their winding positions.

7. In a web winding machine, the combination of a feed drum and an oscillatory support having caging rolls carried thereby for coaction with said feed drum for winding a web upon a core assembly located between the feed drum and the caging rolls, means for moving said caging rolls away from and toward the feed drum with the delivery of a core assembly to an initial winding position between the feed drum and the caging rolls and the discharge of the partially wound core assembly from said initial winding position, respectively, means for supporting the discharged partially wound core assembly for completion of the web winding operation, means controlled by said support for severing the web upon completion of the web winding operation on the core assembly, a guide for directing core assemblies toward the feed drum, an oscillatory carrier for moving core assemblies one at a time from said guide to an initial winding position between the feed drum and said caging rolls, and a spider means controlled by said oscillatory carrier for moving core assemblies one at a time from said guide to the carrier.

8. In a web winding machine, the combination of a web winding means, tubular members on which the web is wound, guide and delivery means for delivering tubular members one at a time to said web winding means, reinforcing members removably receivable in the tubular members, means for moving wound tubular members discharged from the web winding means one at a time to a position in axial alignment with a tubular member in said guide and delivery means, and means for transferring the reinforcing member from its containing tubular member to the empty tubular member in axial alignment therewith.

NICHOLAS MARCALUS.

REFERENCES CITED

The following references are of record in the file of this patent:

UNITED STATES PATENTS

| Number | Name | Date |
|---|---|---|
| 1,623,322 | Marcalus | May 10, 1932 |
| 1,960,452 | Parsons | May 29, 1934 |
| 2,366,999 | Campbell | Jan. 9, 1945 |
| 2,385,691 | Corbin et al. | Sept. 25, 1945 |
| 2,385,692 | Corbin et al. | Sept. 25, 1945 |